United States Patent
Skaff et al.

(10) Patent No.: US 10,867,216 B2
(45) Date of Patent: Dec. 15, 2020

(54) DEVICES, SYSTEMS, AND METHODS FOR DETECTING UNKNOWN OBJECTS

(71) Applicant: CANON KABUSHIKI KAISHA, Tokyo (JP)

(72) Inventors: Sandra Skaff, Mountain View, CA (US); Jie Yu, Santa Clara, CA (US); Francisco Imai, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 15/457,067

(22) Filed: Mar. 13, 2017

(65) Prior Publication Data

US 2017/0270389 A1   Sep. 21, 2017

Related U.S. Application Data (60) Provisional application No. 62/308,770, filed on Mar. 15, 2016.

(51) Int. Cl.
*G06K 9/00* (2006.01)
*G06K 9/62* (2006.01)

(52) U.S. Cl.
CPC ................................. *G06K 9/6277* (2013.01)

(58) Field of Classification Search
None
See application file for complete search history.

(56) References Cited

U.S. PATENT DOCUMENTS

| | | | |
|---|---|---|---|
| 8,170,280 B2 * | 5/2012 | Zhao | G06K 9/00295 382/103 |
| 8,385,632 B2 | 2/2013 | Porikli | |
| 8,411,935 B2 | 4/2013 | Eaton | |
| 8,774,515 B2 | 7/2014 | Mensink | |
| 8,873,868 B2 * | 10/2014 | Nakano | G06K 9/6254 382/228 |
| 8,923,609 B2 | 12/2014 | Eaton | |
| 9,235,752 B2 | 1/2016 | Eaton | |
| 10,062,008 B2 * | 8/2018 | Heusch | G06K 9/626 |
| 2009/0141940 A1 * | 6/2009 | Zhao | G06K 9/00295 382/103 |
| 2011/0099133 A1 | 4/2011 | Chang | |
| 2014/0376819 A1 | 12/2014 | Liu | |

OTHER PUBLICATIONS

Bendale et al., "Towards open set deep networks", published Nov. 2015 (Year: 2015).*
Walter J. Scheirer et al., Towards Open Set Recognition, Oct. 2012.
(Continued)

*Primary Examiner* — Soo Jin Park
(74) *Attorney, Agent, or Firm* — Canon U.S.A., Inc. IP Division (57) ABSTRACT

Devices, systems, and methods obtain a region of an image; generate known-object scores for the region using known-object detectors, wherein each known-object detector of the known-object detectors detects objects in a respective object class; determine a likelihood that the region includes a complete object; and determine a likelihood that the region includes an unknown object based on the likelihood that the region includes a complete object and on the known-object scores.

7 Claims, 5 Drawing Sheets

(56) References Cited

OTHER PUBLICATIONS

Abhijit Bendale et al., Towards Open World Recognition, CVPR 2015, Jun. 2015.
Saurabh Gupta et al., Learning Rich Features from RGB-D Images for Object Detection and Segmentation, ECCV 2014, Sep. 2014.
Mårten Bjorkman et al., Detecting, segmenting and tracking unknown objects using multi-label MRF inference, Oct. 2013.
Ross Girshick, Fast R-CNN, Sep. 2015.
Saurabh Gupta et al., Cross Modal Distillation for Supervision Transfer, CVPR 2016, Jun. 2016.
Saurabh Gupta et al., Perceptual Organization and Recognition of Indoor Scenes from RGB-D Images, CVPR 2013, Jun. 2013.
Piotr Dollar et al., Structured Forests for Fast Edge Detection, ICCV 2013, Dec. 2013.
Pablo Arbelaez et al., Multiscale Combinatorial Grouping, CVPR 2014, Jun. 2014.
Alex Krizhevsky et al., ImageNet Classification with Deep Convolutional Neural Networks, NIPS 2012, Dec. 2012.
Ross Girshick et al., Rich Feature Hierarchies for Accurate Object Detection and Semantic Segmentation, CVPR 2014, Jun. 2014.
Michal Grega et al., Automated Detection of Firearms and Knives in a CCTV Image, Jan. 2016.
Xiaoyu Ge et al., Visual Detection of Unknown Objects in Video Games Using Qualitative Stability Analysis, Dec. 2015.
Gert Kootstra et al., Fast and Automatic Detection and Segmentation of Unknown Objects, Dec. 2010.

* cited by examiner

DEVICES, SYSTEMS, AND METHODS FOR DETECTING UNKNOWN OBJECTS

CROSS-REFERENCE TO RELATED APPLICATIONS

This application claims the benefit of U.S. Provisional Application No. 62/308,770, which was filed on Mar. 15, 2016.

BACKGROUND

Technical Field

This application generally relates to computer vision.

Background

Computer-vision systems are often trained to recognize objects from known classes of objects, such as people, cars, and objects. Labeled images are used to train the computer-vision systems to identify the classes of objects.

SUMMARY

Some embodiments of a system comprise one or more computer-readable media and one or more processors that are coupled to the one or more computer-readable media. The one or more processors are configured to cause the system to obtain a region of an image; generate known-object scores for the region using known-object detectors, wherein each known-object detector of the known-object detectors detects objects in a respective object class; determine a likelihood that the region includes a complete object; and determine a likelihood that the region includes an unknown object based on the likelihood that the region includes a complete object and on the known-object scores.

Some embodiments of a method comprise obtaining a region of an image; generating known-object scores for the region using known-object detectors, wherein each known-object detector of the known-object detectors detects objects in a respective object class; and determining that the region includes an unknown object based on the known-object scores.

Some embodiments of one or more computer-readable media store instructions that, when executed by one or more computing devices, cause the one or more computing devices to perform operations. The operations comprise obtaining a region of an image; generating known-object scores for the region using known-object detectors, wherein each known-object detector of the known-object detectors detects objects in a respective object class; and determining whether the region includes an unknown object based on the known-object scores.

DETAILED DESCRIPTION

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
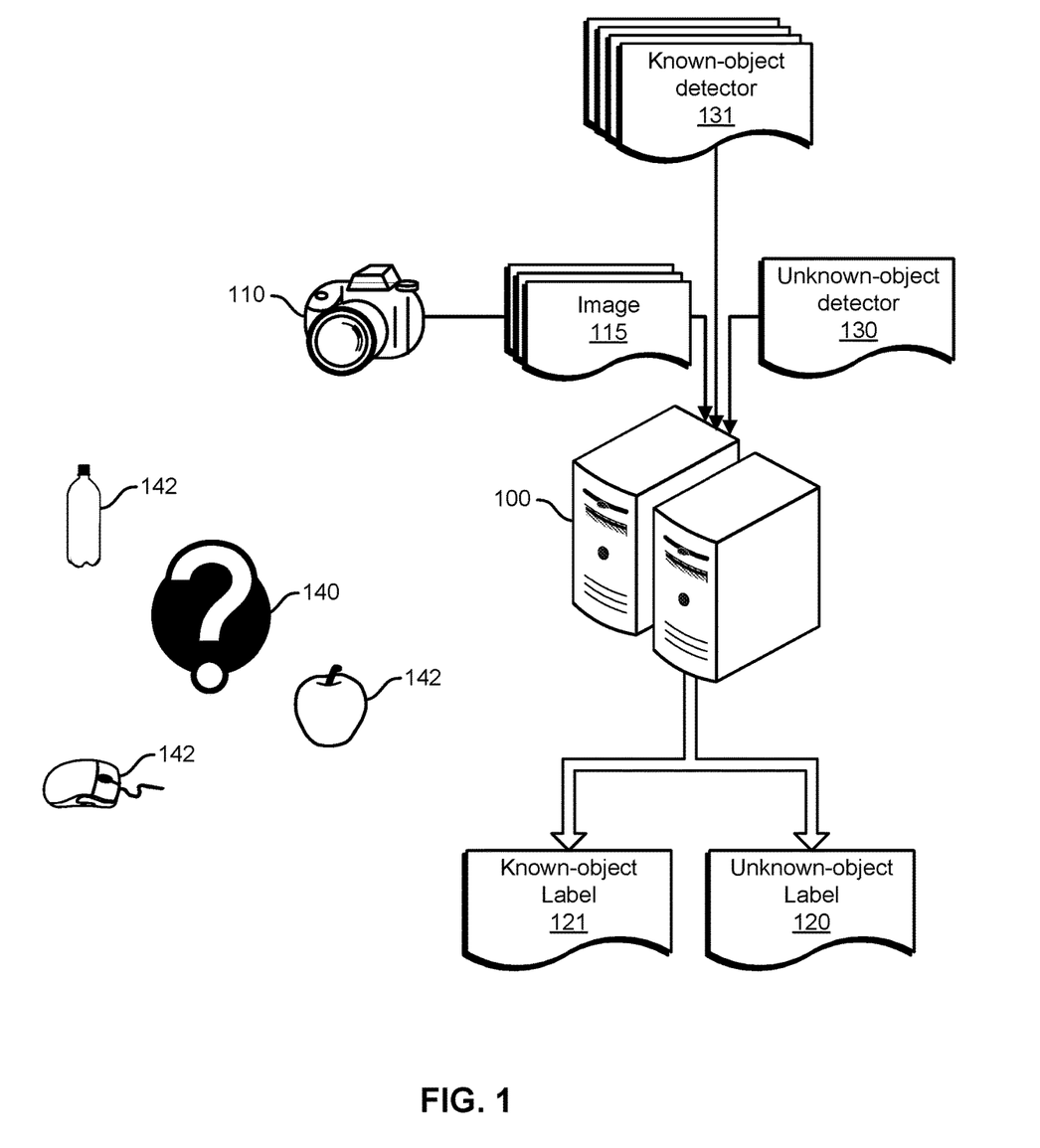
FIG. 1 illustrates an example embodiment of a system for detecting unknown objects.

FIG. 1 illustrates an example embodiment of a system for detecting unknown objects. The system includes one or more object-detection devices 100 and at least one camera 110. The camera 110 captures images 115 of objects. The objects include various known objects 142 and an unknown object 140. The one or more object-detection devices 100 obtain the images 115, obtain known-object detectors 131, obtain an unknown-object detector 130, identify the respective classes of the known objects 142, label the known objects 142 with respective known-object labels 121, identify the unknown object 140, and label the unknown object with an unknown-object label 120.

Also, a known-object detector 131 is a detector (e.g., a classifier) that detects objects that belong to a respective class by outputting a probability or a likelihood that an object belongs to the respective class. For example, a known-object detector 131 may be a classifier that is designed or trained to output a score that indicates a probability or a likelihood that an object belongs to a respective object class. Also for example, a known-object detector 131 may be a detector that the object-detection devices 100 can use to determine the probability or the likelihood that an object belongs to the 'table' class, and 'table' may be the known-object label 121 of the 'table' class. If the known-object detector 131 outputs a high probability or a high likelihood that a detected object is in the 'table' class, then the object-detection devices 100 can assign the 'table' known-object label 121 to the detected object. Other examples of classes and their respective known-object labels 121 include 'car,' boat,'airplane','train,' 'wheel,' dog,'cat,' 'animal,' 'bottle,' 'apple,' 'mouse,' 'chair,' 'couch,' 'table,' 'human,' 'pen,' 'book,' 'tree,' 'grass,' and 'flower.' If the object-detection devices 100 determine that there is a high probability or a high likelihood that an object does belong to the respective class of a detector, then the object-detection devices 100 can label the object with the label of the class.

If an object belongs to a class, and if at least one known-object detector 131 has been designed or trained to determine a probability or a likelihood that an object belongs to the class of the object, then the object is a known object 142, the class is a known class, and the associated known-object label 121 describes the class. Thus, a "known-object label" is a label that identifies a class for which the one or more object-detection devices 100 have a known-object detector 131 that detects objects that belong to the class.

Additionally, an unknown object is an object that belongs to a class that none of the known-object detectors 131 can detect (i.e., belongs to a class and none of the known-object detectors 131 has been designed or trained to determine a probability or a likelihood that an object belongs to the class). For example, if the known-object detectors 131 are classifiers, then unknown objects are the objects that belong to classes that none of the known-object detectors 131 have been designed or trained to output a score that indicates a probability or a likelihood that an object belongs to the classes. And the unknown-object detector 130 has been designed or trained to output a probability or a likelihood that an object does not belong to any of the known classes.

For example, if each of five known-object detectors 131 outputs a respective score that indicates a likelihood that an object belongs to a class that the known-object detector 131 can recognize, then the five scores for an object may be 0.21 for a 'chair' class, 0.44 for a 'book' class, 0.52 for a 'television' class, 0.37 for a 'door' class, and 0.29 for a 'refrigerator' class. If the unknown-object detector 130 outputs a score of 0.58, then the one or more object-detection devices 100 may determine that the object is an unknown object. But if the unknown-object detector 130 outputs a score of 0.26, then the one or more object-detection devices 100 may determine that the object is an object that belongs to the 'television' class.

Figure 2:
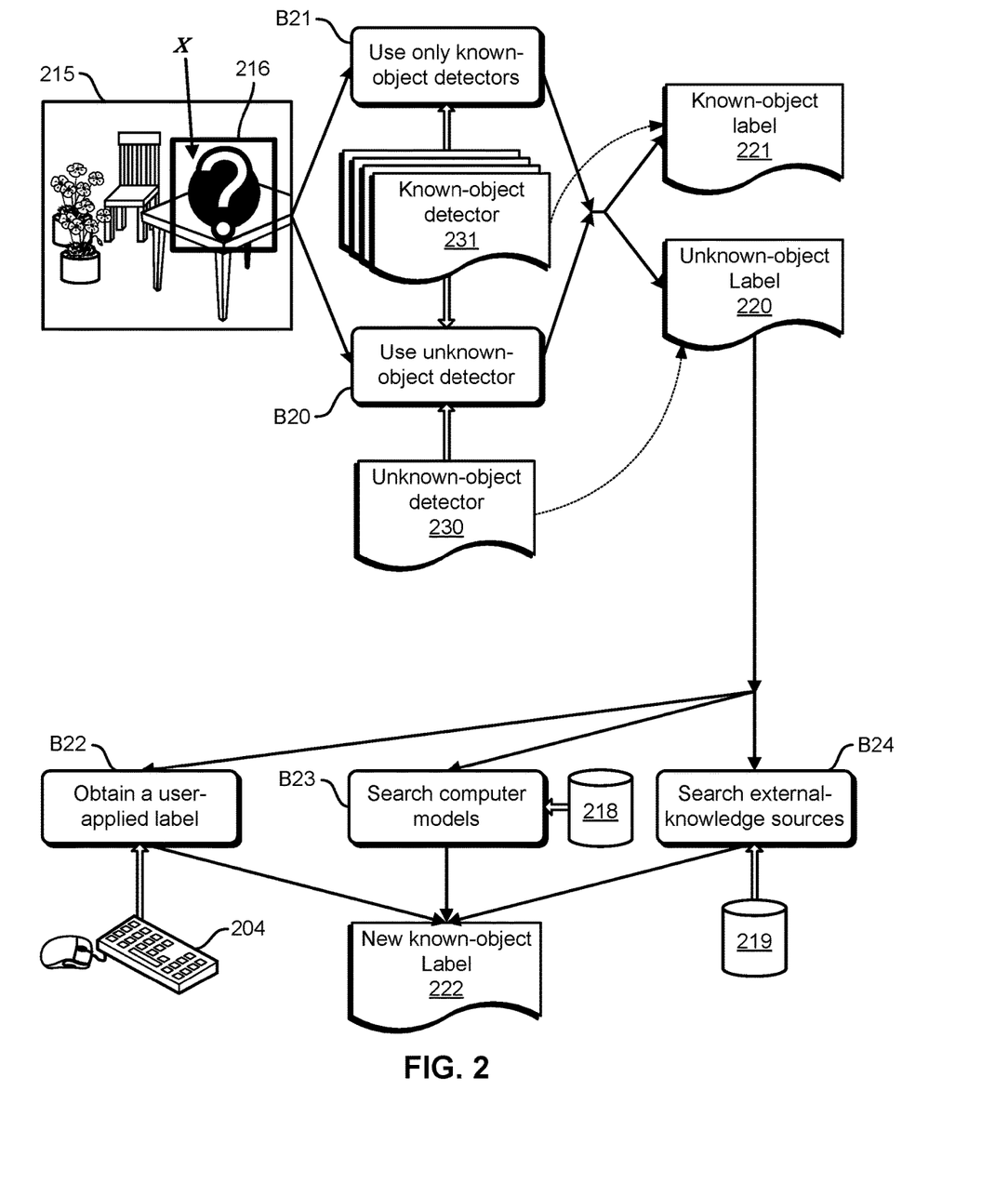
FIG. 2 illustrates an example embodiment of the flow of information in a system for detecting unknown objects.

FIG. 2 illustrates an example embodiment of the flow of information in a system for detecting unknown objects. The operations in blocks B20-B24 can be performed by one or more object-detection devices or one or more other specially-configured computing devices.

First, the one or more object-detection devices obtain an image 215 and then perform block B20 or, alternatively, block B21. In block B20, the one or more object-detection devices use both an unknown-object detector 230 and one or more known-object detectors 231 on a region x in the image 215. In this embodiment, the region x is delineated by a bounding box 216. The unknown-object detector 230 detects objects that belong to the class of unknown objects, and each of the one or more known-object detectors 231 detects objects that belong to a respective known class. In some embodiments, the unknown-object detector 230 and the one or more known-object detectors 231 include classifiers (e.g., Support Vector Machine (SVM) classifiers, Linear discriminant analysis (LDA) classifiers), and the unknown-object detector 230 is a classifier that has been trained using the negatives of the known-object detectors 231. Also, the unknown-object detector 230 and each of the one or more known-object detectors 231 has a respective scoring function $S(C,x)$.

For example, some embodiments of the unknown-object detector 230 generate an unknown-object classification score for the region x that can be described by the following scoring function:

$$S(C_{K+1}, x) = \alpha S^{obj}(x) + \beta \sum_{i=1}^{K} \frac{1}{S(C_i, x)}, \quad (1)$$

where $S^{obj}(x)$ generates a score that indicates whether the region x includes an object candidate; where $S(C_i, x)$ is a scoring function that scores the object candidate in the region x as belonging to known class i, where $i=1, \ldots, K$; where $C_{K+1}$ is the class of unknown objects; and where $\alpha$ and $\beta$ are weighting parameters. Thus, in some embodiments unknown objects are treated as a separate class of objects, and a score is generated that indicates the probability of the likelihood that an object belongs to the class of unknown objects. Additionally, a scoring function $S(C, x)$ may depend on the classifier that is used. For example, for an SVM classifier the scoring function $S(C, x)$ is a function of the weights and bias matrices of a trained classifier, and for a K-means classifier the scoring function $S(C, x)$ is a function of a distance from a cluster mean.

In block B20, the one or more object-detection devices also use known-object detectors 231. Each known-object detector 231 implements a respective scoring function $S(C_i, x)$, which scores an object candidate in the region x as belonging to a known class $C_i$. If the unknown-object classification score for a region x is higher than all of the known-object classification scores for the region x, then the one or more object-detection devices assign the unknown-object label 220 to the region x. Otherwise, the one or more object-detection devices assign the respective known-object label 221 of the known-object detector 231 that has the highest known-object classification score to the region x. Thus, if $S(C_{K+1}, x) > S(C_i, x)$, $\forall i \in \{1, 2, \ldots, K\}$, then the unknown-object label 220 is assigned to the region x, and if $S(C_{K+1}, x) < S(C_i, x)$ for even one $i \in \{1, 2, \ldots, K\}$, then the known-object label 221 of the class $C_i$ of the known-object detector 231 that has the highest known-object classification score $S(C_i, x)$ is assigned to the region x.

In contrast to block B20, in block B21 only the known-object detectors 231 are used. Given a region x, the probability that the region x includes an object of class $C_i$ can be described by the following:

$$P(C_i | x) = \frac{\exp(S(C_i, x))}{\sum_{k=1}^{K} \exp(S(C_k, x))}. \quad (2)$$

The space of classes can be split into the set of known classes K and the set of unknown classes U, and thus $P(U)=1-P(K)$. Consequently, the probability that a region x belongs to the unknown class $C_{K+1}$, denoted by $P(C_{K+1}|x)$, can be described by the following:

$$P(C_{K+1} | x) = \left[1 - \sum_{k=1}^{K} P(C_k | x)\right] * P(x^{obj}). \quad (3)$$

If $P(C_{K+1}|x) < P(C_i|x)$ for even one $i \in \{1, 2, \ldots, K\}$, then the known-object label 221 of the class $C_i$ of the known-object detector 231 that has the highest probability is assigned to the region x. And if $P(C_{K+1}|x) > P(C_i|x)$ for $\forall i \in \{1, 2, \ldots, K\}$, then the unknown-object label 220 is assigned to the region x.

The probability $P(C_{K+1}|x)$ that a region x belongs to the unknown class $C_{K+1}$ can also be described by the following:

$$P(C_{K+1} | x) = \left[\prod_{k=1}^{K} (1 - P(C_k | x))\right] * P(x^{obj}). \quad (4)$$

If the unknown object label 220 is assigned to the region x, then the one or more object-detection devices can create a new class for the object in the region x by performing one or more of blocks B22-B24. In block B22, the one or more object-detection devices obtain a user-applied label from a user by means of one or more input devices 204 and use the user-applied label as the new known-object label 222 of the new class. In block B23, the one or more object-detection devices search for computer models (e.g., CAD models) of the unknown object in the region x in a model repository 218. For example, the one or more object-detection devices may search for an image of a CAD model that most closely matches the object in the region x. The search may use one or more types of visual features, such as scale-invariantfeature-transform (SIFT) features, Fisher vectors, and compressed-histogram-of-gradients (CHoG) features. A label of the CAD model can then be used as the new known-object label 222 of the new class.

In block B24, the one or more object-detection devices search one or more other external-knowledge sources 219, for example ImageNet or the Internet, for a labeled image that matches the region x. The label of the image can then be used as the new known-object label 222 of the new class. If the one or more object-detection devices can access the API but not the entire database of an external-knowledge source 219, then the one or more object-detection devices can upload (i) the region x, (ii) a representation of the region x in visual-feature form, or (iii) a representation of the image 215 in another form as required by the API, and the API of an external-knowledge source 219 can return a candidate new known-object label 222 of the unknown object in the region x.

Figure 3:
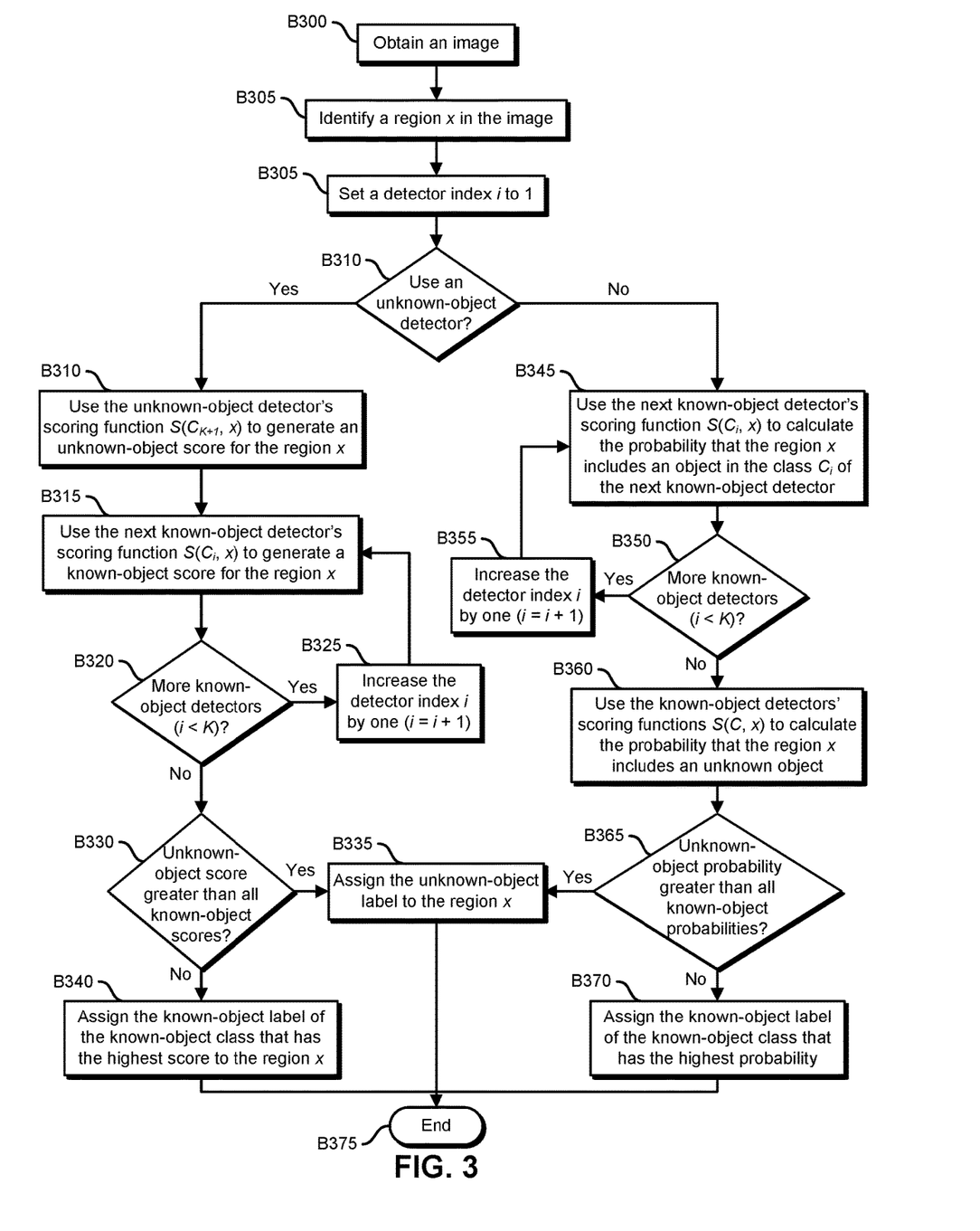
FIG. 3 illustrates an example embodiment of an operational flow for detecting unknown objects.

FIG. 3 illustrates an example embodiment of an operational flow for detecting unknown objects. Although this operational flow and the other operational flows that are described herein are each presented in a certain order, some embodiments of these operational flows may perform at least some of the operations in different orders than the presented orders. Examples of possible different orderings include concurrent, overlapping, reordered, simultaneous, incremental, and interleaved orderings. Thus, other embodiments of the operational flows that are described herein may omit blocks, add blocks, change the order of the blocks, combine blocks, or divide blocks into more blocks.

Furthermore, although this operational flow and the other operational flows that are described herein are performed by an object-detection device, other embodiments of these operational flows may be performed by two or more object-detection devices or by one or more other specially-configured computing devices.

The flow starts in block B300, where an object-detection device obtains an image. Next, in block B305, the object-detection device identifies a region x in the image. The region x includes a candidate object. The flow then moves to block B305, where the object-detection device sets a detector index i to one. The flow then proceeds to block B310, where the object-detection device determines if it will use an unknown-object detector in addition to known-object detectors. If yes (block B310=Yes), then the flow moves to block B310. Otherwise (block B310=No) the flow moves to block B345.

In block B310, the object-detection device uses the unknown-object detector's scoring function $S(C_{K+1}|, x)$ (e.g., as described in equation (1)) to generate an unknown-object score for the region x. Next, in block B315, the object-detection device uses the next known-object detector's scoring function $S(C_i, x)$ to generate a respective known-object score for the region x. The flow then proceeds to block B320, where the object-detection device determines if it should use an additional known-object detector (i<K) to calculate a known-object score. If yes (block B320=Yes), then the flow moves to block B325, where the object-detection device increases the detector index i by one, and then the flow returns to block B315. Otherwise (block B320=No) the flow proceeds to block B330.

In block B330, the object-detection device determines if the unknown-object score is greater than all of the known-object scores. If yes (block B330=Yes), then the flow moves to block B335, where the unknown-object label is assigned to the region x, and then the flow ends in block B375. If not (block B330=No), then the flow moves to block B340, where the known-object label of the known-object detector that has the highest score is assigned to the region x, and then the flow ends in block B375.

For example, if the object-detection device has three known-object detectors, one for the 'animal' class, one for the 'tree' class, and one for the 'machine' class, and if the known-object score for the 'animal' class is higher than the known-object scores for the 'tree' class and the 'machine' class and higher than the unknown-object score, then in block B340 the object-detection device will assign the 'animal' label to the region x. Even if the unknown-object score is higher than the known-object scores for the 'tree' class and the 'machine' class, as long as the known-object score for the 'animal' class is higher than the known-object scores for the 'tree' class and the 'machine' class and higher than the unknown-object score, then in block B340 the object-detection device will assign the 'animal' label to the region x. However, if the unknown-object score is higher than the scores for the 'tree' class, the 'machine' class, and the 'animal' class, then in block B335 the object-detection device will assign the 'unknown' label to the region x.

If the flow moved to block B345 after block B310, then in block B345 the object-detection device uses the next known-object detector's scoring function $S(C_i, x)$ to calculate the probability that the region x includes an object in the class $C_i$ of the next known-object detector (a known-object probability), for example as described by equation (2). Next, in block B350, the object-detection device determines if it should use an additional known-object detector (i<K) to calculate a probability. If yes (block B350=Yes), then the flow moves to block B355, where the object-detection device increases the detector index i by one, and then the flow returns to block B345. Otherwise (block B350=No) the flow proceeds to block B360.

In block B360, the object-detection device uses the known-object detectors' scoring functions $S(C,x)$ to calculate the probability that the region x includes an unknown-object (an unknown-object probability), for example as described in equation (3) or equation (4). The flow then moves to block B365, where the object-detection device determines if the unknown-object probability is greater than all of the known-object probabilities. If yes (block B365=Yes), then the flow moves to block B335, where the unknown-object label is assigned to the region x, and then the flow ends in block B375. If not (block B365=No), then the flow proceeds to block B370, where the known-object label of the known-object class that has the highest known-object probability is assigned to the region x. Then the flow ends in block B375.

For example, if the object-detection device has three known-object detectors, one for the 'bird' class, one for the 'flower' class, and one for the 'building' class, and if the known-object probability for the 'bird' class is higher than the known-object probabilities for the 'flower' class and the 'building' class and higher than the unknown-object probability, then in block B370 the object-detection device will assign the 'bird' label to the region x. Even if the unknown-object probability is higher than the known-object probabilities for the 'flower' class and the 'building' class, as long as the known-object score for the 'bird' class is higher than the known-object scores for the 'flower' class and the 'building' class and higher than the unknown-object probability, then in block B370 the object-detection device will assign the 'bird' label to the region x. However, if the unknown-object probability is higher than the probabilities for the 'bird' class, the 'flower' class, and the 'building' class, then in block B335 the object-detection device will assign the 'unknown' label to the region x.

Figure 4:
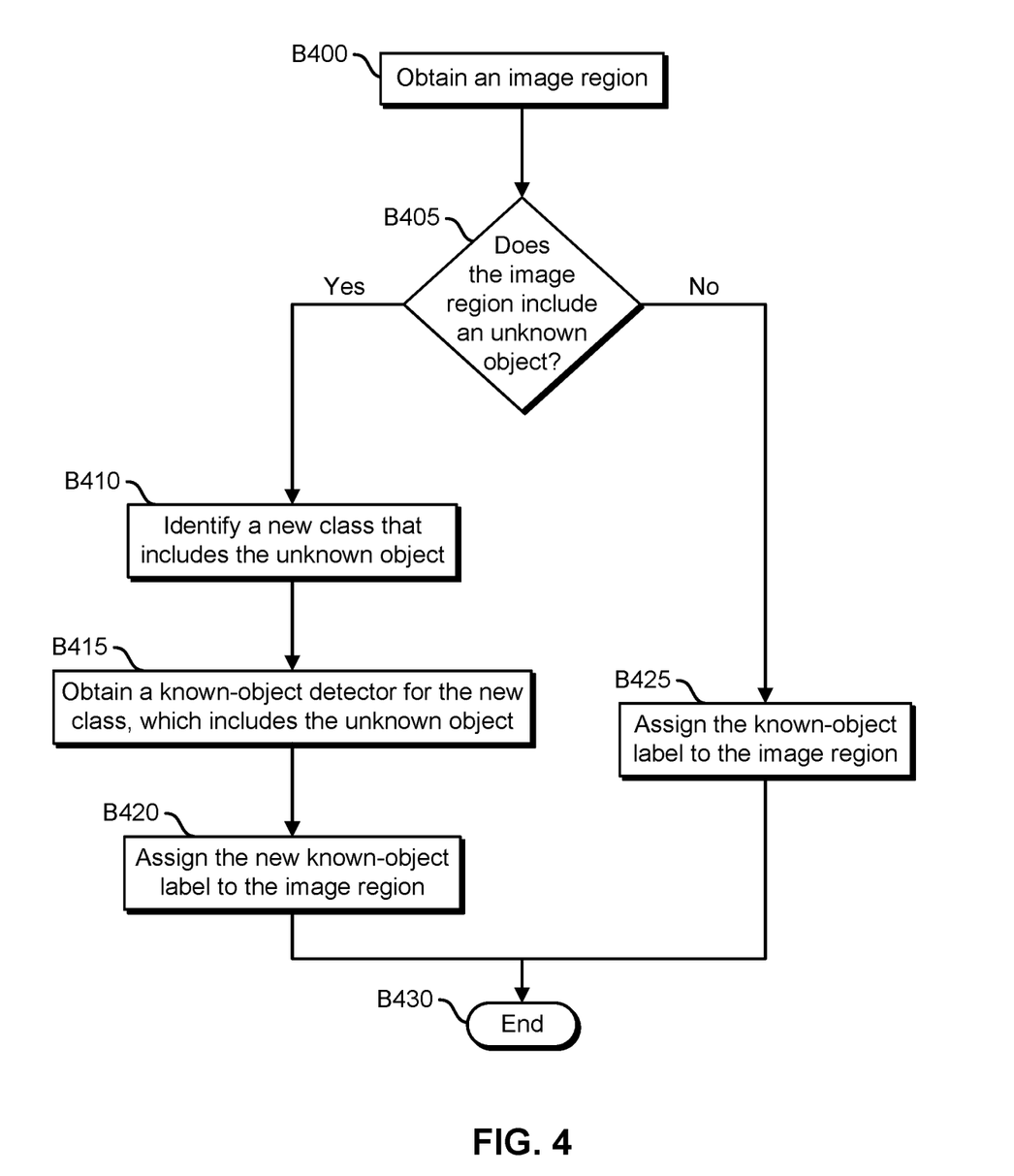
FIG. 4 illustrates an example embodiment of an operational flow for detecting unknown objects.

FIG. 4 illustrates an example embodiment of an operational flow for detecting unknown objects. The flow starts in block B400, where an object-detection device obtains a region of an image (an image region). Then, in block B405, the object-detection device determines if the image region includes an unknown object, for example as described in blocks B305-6375 in FIG. 3. If yes (block B405=Yes), then the flow moves to block B410, where the object-detection devices identifies a new class that includes the unknown object, for example by performing one or more of blocks B22-B24 in FIG. 2. Next, in block B415, the object-detection device obtains or generates a known-object detector for the new class, which includes the unknown object. Then in block B420, the object-detection device assigns the new known-object label, which is the object label of the new class, to the image region. Finally, the flow ends in block B430.

However, if in block B405 the object-detection device determines that the image region includes a known object instead of an unknown object (B405=No), then the flow moves to block B425. In block B425, the object-detection device assigns the proper known-object label to the image region, and then the flow ends in block B430.

Figure 5:
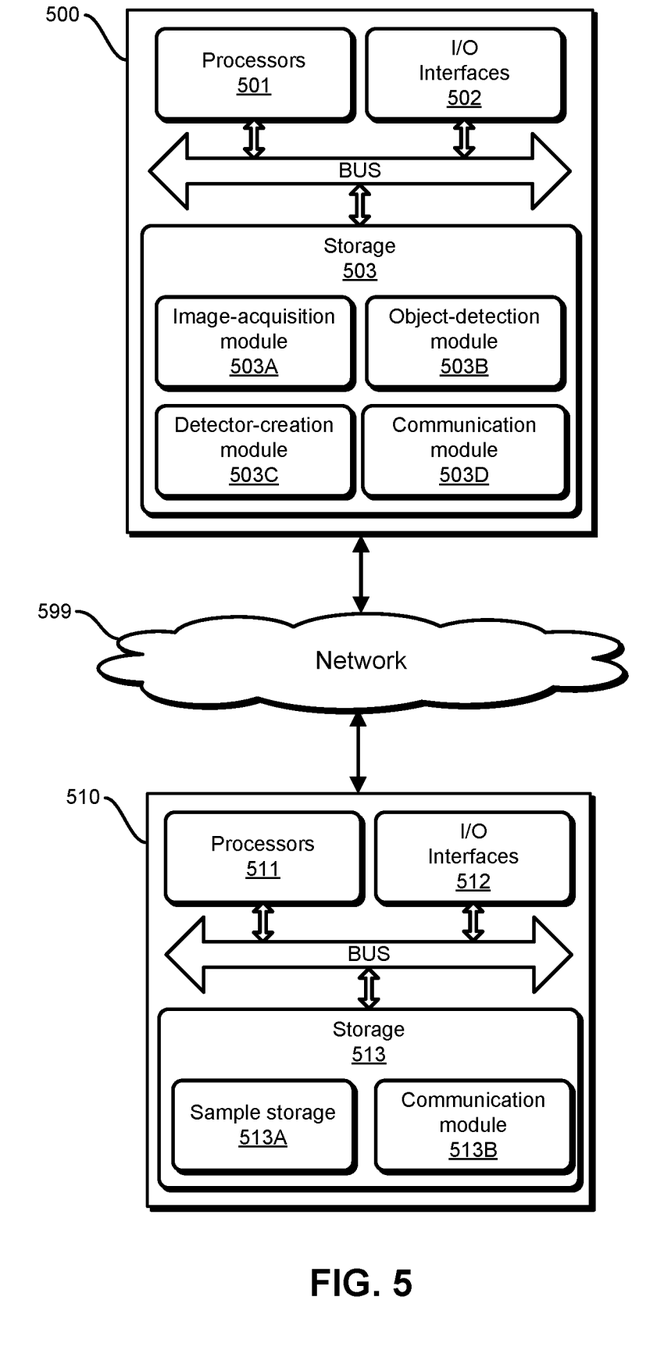
FIG. 5 illustrates an example embodiment of a system for detecting unknown objects.

FIG. 5 illustrates an example embodiment of a system for detecting unknown objects. The system includes an object-detection device 500, which is a specially-configured computing device, and an image-storage device 510. In this embodiment, the devices communicate by means of one or more networks 599, which may include a wired network, a wireless network, a LAN, a WAN, a MAN, and a PAN. Also, in some embodiments the devices communicate by means of other wired or wireless channels.

The object-detection device 500 includes one or more processors 501, one or more I/O interfaces 502, and storage 503. Also, the hardware components of the object-detection device 500 communicate by means of one or more buses or other electrical connections. Examples of buses include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more processors 501 include one or more central processing units (CPUs), which include microprocessors (e.g., a single core microprocessor, a multi-core microprocessor); graphics processing units (GPUs); or other electronic circuitry. The one or more processors 501 are configured to read and perform computer-executable instructions, such as instructions that are stored in the storage 503. The I/O interfaces 502 include communication interfaces for input and output devices, which may include a keyboard, a display device, a mouse, a printing device, a touch screen, a light pen, an optical-storage device, a scanner, a microphone, a drive, a controller (e.g., a joystick, a control pad), and a network interface controller.

The storage 503 includes one or more computer-readable storage media. As used herein, a computer-readable storage medium, in contrast to a mere transitory, propagating signal per se, refers to a computer-readable media that includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). Also, as used herein, a transitory computer-readable medium refers to a mere transitory, propagating signal per se, and a non-transitory computer-readable medium refers to any computer-readable medium that is not merely a transitory, propagating signal per se. The storage 503, which may include both ROM and RAM, can store computer-readable data or computer-executable instructions.

The object-detection device 500 also includes an image-acquisition module 503A, an object-detection module 503B, a detector-creation module 503C, and a communication module 503D. A module includes logic, computer-readable data, or computer-executable instructions, and may be implemented in software (e.g., Assembly, C, C++, C#, Java, BASIC, Perl, Visual Basic), hardware (e.g., customized circuitry), or a combination of software and hardware. In some embodiments, the devices in the system include additional or fewer modules, the modules are combined into fewer modules, or the modules are divided into more modules. When the modules are implemented in software, the software can be stored in the storage 503.

The image-acquisition module 503A includes instructions that, when executed, or circuits that, when activated, cause the object-detection device 500 to obtain an image and identify a region in the image, for example as performed in blocks B300 and B305 in FIG. 3.

The object-detection module 503B includes instructions that, when executed, or circuits that, when activated, cause the object-detection device 500 to detect known or unknown objects in images or image regions and to assign respective labels to the images or the image regions, for example as performed in blocks B20 and B21 in FIG. 2 or in blocks B305-6370 in FIG. 3.

The detector-creation module 503C includes instructions that, when executed, or circuits that, when activated, cause the object-detection device 500 to create respective new known-object detectors for unknown objects, for example as performed in blocks B22-B24 in FIG. 2 or in blocks B410-6415 in FIG. 4.

The communication module 503D includes instructions that, when executed, or circuits that, when activated, cause the object-detection device 500 to communicate with one or more other devices, for example the image-storage device 510.

The image-storage device 510 includes one or more processors 511, one or more I/O interfaces 512, storage 513, sample storage 513A, and a communication module 513B. The communication module 513B includes instructions that, when executed, or circuits that, when activated, cause the image-capturing device 510 to communicate with the object-detection device 500.

At least some of the above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:

1. A system comprising:
one or more computer-readable media; and
one or more processors that are coupled to the one or more computer-readable media and that are configured to cause the system to
generate respective known-object probabilities that a region of an image includes a known-object in a plurality of object classes using a plurality of known-object detectors, wherein each known-object detector of the plurality of known-object detectors detects objects in a respective object class of the plurality of object classes;
generate an unknown-object probability that the region includes an unknown object using the plurality of known-object detectors;
determine whether the region includes an unknown object based on the respective known-object probabilities for the plurality of object classes and the unknown-object probability;
create a new class that includes the unknown object, if the region is determined to include the unknown object;
search for a labeled image which matches the unknown object;
assign a label of the matched labeled image to the unknown object as a new known-object label of the created new class; and
generate a new known-object detector for the created new class.

2. The system of claim 1, wherein the known-object detectors each include a respective scoring function that detects a respective known object.

3. The system of claim 2, wherein the one or more processors are further configured to cause the system to
for each known-object detector, determine a respective known-object probability that is a probability that the region includes an object in the respective object class that is detected by the known-object detector, thereby generating known-object probabilities.

4. The system of claim 3, wherein, to determine a respective known-object probability, the one or more processors are configured to cause the system to perform operations that can be described by $$P(C_i \mid x) = \frac{\exp(S(C_i, x))}{\sum_{k=1}^{K} \exp(S(C_k, x))},$$

where x is the image region, where $S(C_i, x)$ is a scoring function of a known-object detector that detects objects in object class $C_i$, where $S(C_k, x)$ is a scoring function of a known-object detector that detects objects in object class $C_k$, where K is a total number of known-object detectors, and where $P(C_j \mid x)$ is the known-object probability for object class C.

5. A method comprising:
generating respective known-object probabilities that a region of an image includes a known object in a plurality of object classes using a plurality of known-object detectors, wherein each known-object detector of the plurality of known-object detectors detects objects in a respective object class of the plurality of object classes;
generating an unknown-object probability that the region includes an unknown object using the plurality of known-object detectors;
determining whether the region includes an unknown object based on the respective known-object probabilities for the plurality of object classes and the unknown-object probability;
creating a new class that includes the unknown object, if the region is determined to include the unknown object;
searching for a labeled image which matches the unknown object;
assigning a label of the matched labeled image to the unknown object as a new known-object label of the created new class; and
generating a new known-object detector for the created new class.

6. One or more computer-readable media storing instructions that, when executed by one or more computing devices, cause the one or more computing devices to perform operations comprising:
generating respective known-object probabilities that a region of an image includes a known object in a plurality of object classes using a plurality of known-object detectors, wherein each known-object detector of the plurality of known-object detectors detects objects in a respective object class of the plurality of object classes;
generating an unknown-object probability that the region includes an unknown object using the plurality of known-object detectors;
determining whether the region includes an unknown object based on the respective known-object probabilities for the plurality of object classes and the unknown-object probability;
creating a new class that includes the unknown object, if the region is determined to include the unknown object;
searching for a labeled image which matches the unknown object;
assigning a label of the matched labeled image to the unknown object as a new known-object label of the created new class; and
generating a new known-object detector for the created new class.

7. The one or more computer-readable media of claim 6, wherein the known-object detectors each include a respective classifier.

* * * * *